May 20, 1952 D. J. WEBER 2,597,553
APPARATUS FOR LUBRICATING PLASTIC MATERIALS UNDERGOING EXTRUSION
Filed Sept. 17, 1948 2 SHEETS—SHEET 1

Inventor
Donald J. Weber
By W. S. McDowell
Attorney

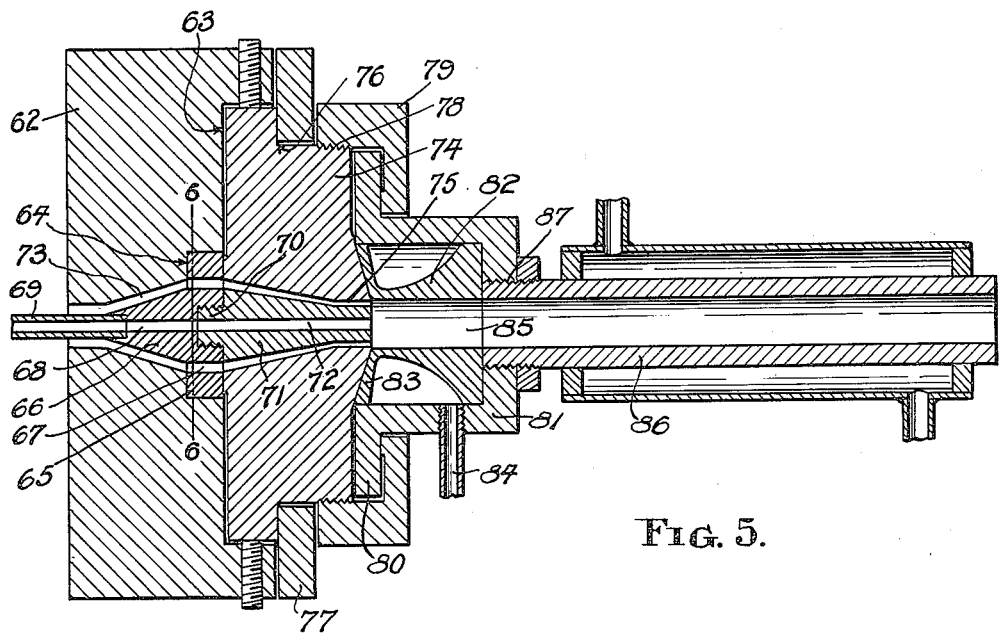
Fig. 5.
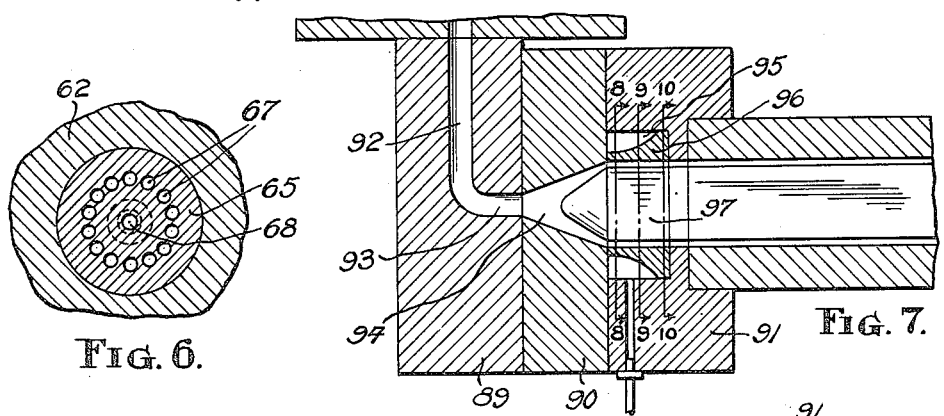
Fig. 6.
Fig. 7.
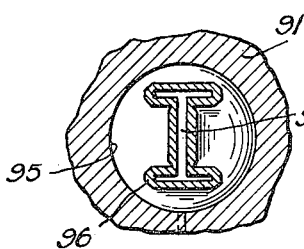
Fig. 8.
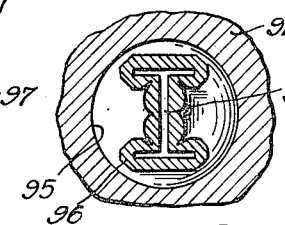
Fig. 9.
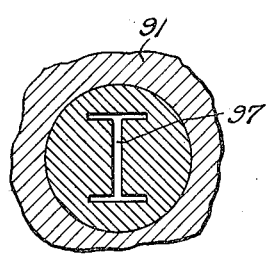
Fig. 10.

Patented May 20, 1952

2,597,553

UNITED STATES PATENT OFFICE 2,597,553

APPARATUS FOR LUBRICATING PLASTIC MATERIALS UNDERGOING EXTRUSION

Donald J. Weber, Richwood, Ohio

Application September 17, 1948, Serial No. 49,798

7 Claims. (Cl. 18—12)

This invention relates to apparatus for extruding plastic materials to produce elongated bodies possessing uniform cross-sectional characteristics throughout their lengths. Among such bodies may be mentioned rods, tubes, strips and sheets.

In the extrusion of plastics to form such bodies, the plastic compounds are heated to reduce the same to a flowable molten state so that the same may be advanced under pressure through the orifice or orifices of a forming die or head in which the desired cross-sectional shape is imparted to the moving plastic mass, the latter being then cooled to cause the same to solidify and assume desired final formations. In such extrusion machines, considerable difficulty has been encountered in the matter of maintaining the desired movement of the plastics while the same are passing through the shape-imparting openings or barrels of the forming head or die.

Plastic materials when so heated become sticky or tacky and the same tend to jam or unduly adhere to the passage walls of the forming head or die and this condition often results in the formation of products which are defective from a standpoint of utilization in that they may contain voids, cracks or other imperfections.

In order to provide for the desired flow of the plastics through such a forming die, it has been the practice in the prior art to introduce a lubricant in limited quantities and under high pressures into the forming passages so that a film of lubricant may be provided between the plastics moving through such passages and the wall surfaces of the passages. Such a system of introducing a lubricant directly into the passages of the forming die or head is difficult to control by conventional valves and pressure forces on the lubricant, often resulting in an excess supply of the lubricant or a too restricted flow.

It is an object, therefore, of the present invention to provide the forming die or head structure of a plastic extruding machine with a chamber formed for the reception of a metallic oil ring and wherein provision is made for forcing a lubricant under pressure through the microscopic pores or interstitial channels of the ring to deposit continuously a film of the lubricant on the inner surfaces of the ring, whereby to facilitate the travel of plastic compositions undergoing shaping formation.

It is another object of the invention to provide a lubricating ring for the heads of plastic extruding machines in which the wall thickness of the ring varies throughout its length, the ring possessing its minimum thickness at the end thereof receiving the plastic materials undergoing extrusion and the opposite or plastic discharge end of the ring possessing its maximum wall thickness, the arrangement being such as to provide for the highest rate of oil delivery to the plastics when they enter the ring and to diminish gradually the supply of lubricant to the ring at the plastics discharge end thereof.

For a further understanding of the invention, reference is to be had to the following description and the accompanying drawings, wherein:

Fig. 1 is a vertical sectional view taken partially through the screw stuffer of a plastics extruding machine and disclosing in association therewith the head or die of such a machine, the cooled forming barrel thereof and the lubricating ring or collar comprising the present invention. In this figure, the extrusion apparatus is adapted for the formation of rods or the like.

Fig. 5 is a vertical sectional view taken through the forming head of an extrusion machine and wherein the head is formed to effect the formation of tubular bodies with the aid of internally pneumatic pressures;

Fig. 6 is a transverse sectional view disclosing the ported spider ring of the extrusion head;

Fig. 7 is a vertical sectional view taken through another form of extrusion head employing my present invention in which the head is adapted for the formation of articles possessing an irregular cross-sectional configuration;

Figure 1:
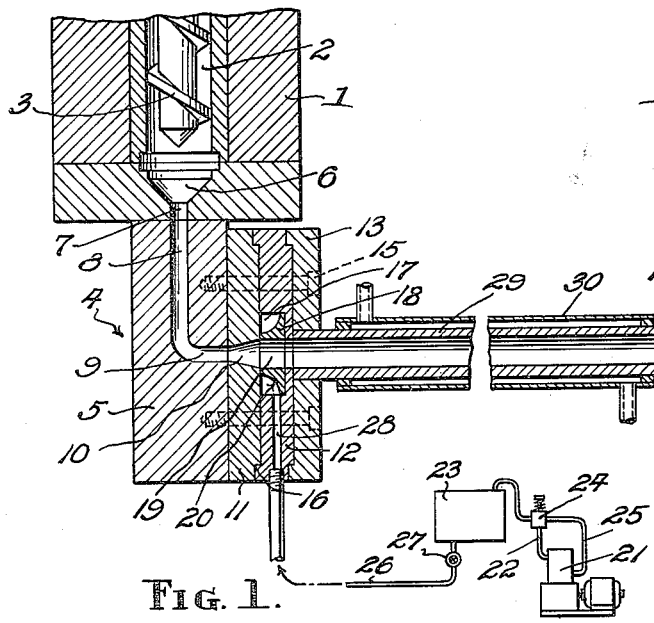
Figure 2:
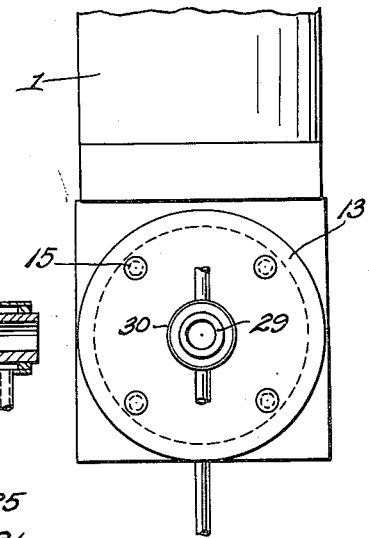
Fig. 2 is a side elevational view of the apparatus disclosed in Fig. 1.

Figs. 8, 9 and 10 are detail transverse sectional views taken on the lines 8—8, 9—9 and 10—10 of Fig. 7.

Referring more particularly to the drawings, the numeral 1 designates the casing of an extrusion machine, which in this instance is disclosed as being situated in a vertical plane. The casing is formed with the usual internal chamber 2 on which is mounted a rotatable stuffer screw 3 by which plastic material in a heated or molten state is advanced to the extrusion head or die 4 of the machine. The casing 1 is provided with a bottom plate 5 having a substantially conical pocket 6 formed therein for receiving the plastic from the chamber 2, the pocket 6 terminating in a reduced passage 7 which communicates with the vertical leg 8 formed in the head or die 4. At its lower end, the leg 8 terminates in a horizontally extending portion 9. The portion 9 is disposed for registration with an outwardly flaring port 10 provided with an inner head plate 11. Cooperative with the plate 11 is an intermediate plate 12 and an outer plate 13, the plates 11, 12 and 13 being formed with registering openings through which headed screws 15 pass for securing the plates to the head or die 4. These plates may be provided with interengaging shoulders 16 to preserve their alignment.

The intermediate plate is formed with an axially arranged chamber 17 in which is provided an oiling ring or collar 18, which forms an essential feature in the present invention. This ring is of metallic composition and is preferably composed of bronze, although the same may be formed from other metals such as brass, stainless steel, Monel metal or any other suitable material having rigidity and sufficient porosity to permit of the passage therethrough of a lubricating oil under pressure, the oil or other lubricant passing through the pores or interstitial passages or crevices of the material comprising the ring so that it will be delivered to the wall surfaces of the internal opening 19 of the ring which is disposed in registration with the larger end of the port 10 provided in the head plate 11.

Preferably, the diameter of the opening 19, which is uniform throughout the length of the opening, is very slightly greater than that of the larger end of the port 10, whereby to facilitate the flow of the heated plastics and to enable the same to pick up the oil sweated on the wall surfaces of the opening 19.

Another important feature of the invention resides in the cross-sectional configuration of the ring 18. By reference to Fig. 1, it will be noted that the ring generally is of frusto-conical configuration, having an annular concave outer wall 20 which causes the ring to possess its minimum wall thickness at its plastics-receiving end and its maximum wall thickness at its plastics-discharge end. By this construction, the chamber 17 provides an oil-containing well around the ring. As a result of the reduced wall thickness at its plastics-receiving end, a larger amount of oil penetrates the ring at the forward or plastics-receiving end thereof, where the larger quantity of oil is needed to insure the sustained and uninterrupted flow of the plastics without allowing the latter to seize or bind on the walls of the aligned forming passages. As the plastics progress through the opening 19 of the ring, the amount of oil supplied thereto is gradually diminished by the increasing wall thickness of the ring. This formation of the ring is of critical importance in a continuous operation of extruding shaped bodies of plastics, as distinguished from an intermittent operation such as that produced by a reciprocating plunger for effecting the advancement of heated plastics through an extruding die. If the wall thickness of the ring were uniform in a continuous operation such as that here disclosed, the oil accumulations on the inner wall surface of the ring will be found to have a tendency to pocket and disfigure the outer surfaces of the formed plastic bodies. However, this objection is entirely eliminated with the employment of a ring having the progressively increasing wall thickness here disclosed.

Lubricating oil may be delivered to the chamber 17 around the ring 18 by the operation of a motor driven pump 21, the outlet line 22 of which leads from the pressure side of the pump to an accumulator tank 23 in which the oil is maintained under a constant predetermined working temperature. A spring-loaded return valve 24 is arranged in a pipe line 25 to return excess oil to the inlet side of the pump when a desired pressure is reached in the tank 23. Leading from the tank 23 is a pipe line 26 having therein a manually operated control valve 27. The pipe line 26 extends to a passage 28 provided in the intermediate plate 12 and which leads to the chamber 17.

The outer head plate 13 is provided with a longitudinally extending barrel 29 of any suitable length. This barrel is arranged in registration and communication with the opening 19 in the ring 18 and possesses the same internal diameter as said opening. Surrounding the barrel 29 is a jacket 30, the walls of the latter being spaced from the outer walls of the barrel to provide a chamber for circulation of water or other coolant for facilitating the solidification and hardening of the formed plastic body, which in the apparatus shown in Fig. 1, comprises a cylindrical rod. When a formed rod is removed from the discharge end of the barrel 29, the same may be cut transversely into suitable lengths and any excess oil present on the outer surfaces thereof removed by a wiping operation. The outer surfaces of the rod are characterized by their smooth finish and surface regularity.

Figure 3:
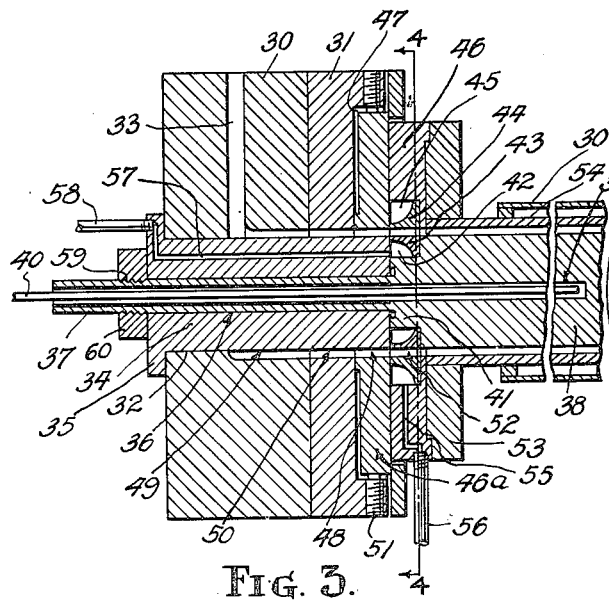
Fig. 3 is a vertical sectional view similar to Fig. 1 but showing the head or die constructed for the extrusion of tubes and other similar hollow bodies. In this figure concentrically arranged inner and outer lubricating rings are disclosed as mounted in the head or die of the machine.
Figure 4:
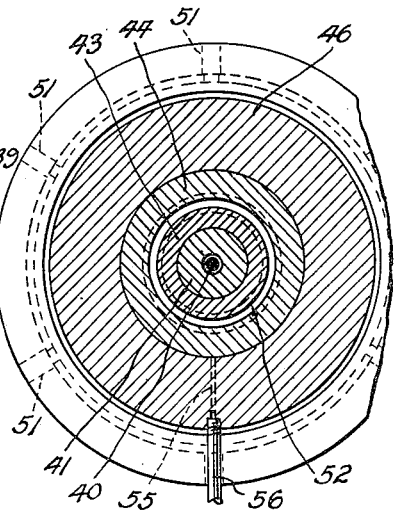
Fig. 4 is a transverse vertical sectional view taken on the line 4—4 of Fig. 3.

In the apparatus illustrated in Figs. 3 and 4, provision is made for the extrusion of hollow bodies, such as sleeves, pipes or the like, and more particularly to sleeves and pipes of larger diameters than those heretofore made in the extrusion of plastics, that is, pipes or tubes having an outside diameter of two inches or greater. In this form of my invention, the extrusion die comprises head plates indicated at 30 and 31 and which are bolted or otherwise secured together. The head plate is provided with a horizontal bore 32 and a vertically disposed passage 33. Through this passage, the heated plastics are forced by a packer screw, such as that shown at 3 in Fig. 1, the plastics being under a temperature of the order of from 275° F. to 550° F.

Positioned in the bore 32 is a core 34 having a flanged end 35 for engagement with an outer surface of the head plate 30. The core is formed with an axial opening 36 in which is positioned the reduced tubular extension 37 of a longitudinally and horizontally extending stationary mandrel 38. The extension 37 and the body of the mandrel 38 are formed with an axial passage 39 for the reception of a coolant pipe 40. A coolant is introduced into this pipe at one end thereof and is discharged at its opposite end from the pipe into the passage 39. In the passage 39, the coolant flows in the direction opposite to that which takes place in the pipe 40, and is discharged from the outer end of the extension 37. The extension 37 terminates inwardly in an integral boss 41 which possesses a greater diameter than said extension but a smaller diameter than that of the body of the mandrel 38. This construction provides an annular recess 42 in which is positioned an inner oiling ring 43. This ring corresponds in its cross-sectional configuration with the ring 18 of Fig. 1. The outer peripheral surface of the ring 43 is disposed in registration with the corresponding surface of the mandrel 38 and in spaced concentric relation to the annular inner surface of a complemental outer oiling ring 44, the latter being stationarily mounted and suitably retained in an annular recess 45 provided in a head plate 46. This plate is mounted adjacent to the outer surface of an adjustable plate 46a, the latter being disposed in a recess 47 provided in the outer side of the head plate 31. The plate 46a is formed with an axial opening 48 which registers with similar openings 49 and 50 provided in the plates 30 and 31, the opening 49 communicating at one end with the passage 33.

The head plate 46a is adjustable in the recess 47 by the provision of a plurality of radially disposed screws 51 which are carried by the periphery of the plate 31. By adjusting the screws 51, the axial opening 48 in the head plate 46a may be brought into desired registration with the openings 49 and 50 and with the annular space 52 formed between the inner and outer oiling rings 43 and 44. The plate 46 is joined with an outer cap plate 53 which is carried by the inner end of a stationary tube 54 which surrounds and is spaced from the mandrel 38, providing a circular forming chamber through which the plastics are advanced after being lubricated on both inner and outer surfaces by the oiling rings 43 and 44.

The plate 46 is formed with a restricted passage 55 which communicates with a pipe line 56 through which a lubricant is advanced under pressure for the purpose of forcing the lubricant through the outer ring 44 and on to the surfaces of the plastic materials flowing through the die head. To lubricate the inner ring 43, the core 34 is provided with a similar restricted passage 57, which leads to the recess 42, the outer end of the passage 57 communicating with the pipe line 58 leading to a source of lubricant supply under pressure.

The tube 54 is provided with a water circulating jacket, not shown, corresponding to the jacket 36 of Fig. 1. The extension 37 is exteriorly threaded as at 59 for the reception of a clamping nut 60, the latter engaging the beaded end 35 of the core 34. By this arrangement, tubular plastic products may be extruded having a uniform density and with smooth regular inner and outer wall surfaces. The apparatus particularly lends itself to the production of tubes of larger diameters than those heretofore produced by apparatus of this character, the production of such tubes being made possible by the inner and outer oiling rings 43 and 44 and their cross-sectional configuration.

While the rings provide for a controlled application of an oil film to inner and outer surfaces of the plastic materials undergoing formation, they specifically prevent the accumulation of pockets of oil, as so often occurs in prior extruding machines of the continuously operating type. If the oil should so pocket and not become uniformly distributed in the form of a thin film over the surfaces of the plastic materials, the latter tend to jam in the small passages of the die head and produce imperfectly shaped ware. The proper distribution of the oil is accomplished as a result of the arrangement in cross-sectional configuration of the oiling rings of the present apparatus.

The inner walls of the tubular extension 37 of the mandrel may be provided with a sleeve 61 composed of a thermal insulation to minimize heat transference between the coolant and the heated core section 34 of the mandrel.

In the apparatus illustrated in Figs. 5 and 6, extrusion means for the formation of tubes or pipes of plastic composition has been illustrated. This apparatus involves a simplified design somewhat less costly to produce than the apparatus of Fig. 3, the apparatus of Fig. 5 being particularly useful in the manufacture of tubes or pipes of diameters smaller than those produced by the apparatus of Fig. 3 as, for example, pipes or tubes having an outside diameter of two inches or less.

The apparatus of Fig. 5 involves a stationary die head 62, having one of its sides formed with a recess 63 which includes an axially disposed chamber 64. Positioned in this chamber is a flange 65 formed at one end of a nozzle section 66, the flange 65 being provided with a multiplicity of circularly arranged ports 67. The nozzle section includes an axial passage 68. At one end the passage 68 communicates with a pipe 69 by means of which air under pressure is admitted into the nozzle. At the end of the passage 68 opposite to the pipe 69, there is provided a threaded socket for the reception of a threaded nipple 70 provided on a second nozzle section 71, the latter being formed with an axial passage 72 communicating with the passage 68. The die head 62 is provided with an opening 73 for the passage of heated plastic materials, the latter being forced through the openings 73 in a continuous manner by a packer or stuffer screw, not shown, similar to the screw 3.

Positioned in the recess 63 of the die head is a block 74 having an axial opening 75 which constitutes a continuation of the opening 73 and the head 62 and the ports 67 of the flange 65 for the sustained advance of the heated plastic materials through the die structure and around the nozzle sections. The walls of the openings 75 possess greater angularity than the outer walls of the nozzle section 71 so that a smooth restricted throat is produced around the nozzle section 71 for the flow of the plastic materials. The block 74 is provided with an annularly shouldered region 76 which engages with a retaining ring 77, holding the block in its operative position and against longitudinal displacement. The block is also exteriorly threaded as at 78 for the reception of a collar 79. This collar engages with the flanged end 80 of a thimble 81, holding the end 80 in contact with one of the wall surfaces of the block 74.

Within the thimble, there is positioned an oil ring 82 of the general type previously described, except that in this instance, the ring is formed with a positioning flange 83 at one end thereof. In general, the body of the ring 82 possesses the gradually increasing wall thickness which is characteristic of the oil rings employed by the present invention. Within the thimble, there is provided a well around the oil ring which is supplied with oil under pressure by way of the pipe line illustrated at 84. The ring is formed with a longitudinal bore 85 which communicates at one end with the opening 75 and at its opposite end with an opening provided in a stationary barrel 86. This barrel is threaded at one end as at 87 into the closed end of the thimble 81 or may be welded thereto as desired. Surrounding the barrel is a jacket 88 for the reception of a circulating coolant. In the operation of the apparatus of Fig. 5, the heated plastic material flows through the opening 73, the port 67 and the opening 75 where it merges into the bore 85 of the oil ring 82.

Simultaneously, air under pressure is delivered into the bore 85 by way of the passages 68 and 72. The air pressure maintains the heated plastic materials in engagement with the walls of the bore 85 and the barrel 86 so that the desired tubular form of the resinous material is produced and maintained until the heated plastic materials cool and become set or hardened. Lubricant is applied through the porous oil ring as previously described, so that continuous operation may be maintained with the formed products having a smooth outer wall finish.

The apparatus illustrated in Figs. 7 to 10 inclusive discloses an adaptation of the present invention to the extrusion of strips or bars having an irregular transverse configuration. An I-shaped section, for example, such as that illustrated in Figs. 8 through 10 is difficult, if not impossible, to produce on extrusion machines and having conventional lubricating means. However, with oil rings having the progressively increasing wall thicknesses, such extrusions are entirely possible and practicable.

In Fig. 7, the die head comprises a plurality of blocks indicated at 89, 90 and 91, these blocks being suitably joined together in assembled relation by bolts, screws or other conventional fastening means. The block 89 is provided with a passage 92 for the flow of the heated plastic materials under the action of an extrusion screw or auger of the type indicated at 3 in Fig. 1. At its lower end, the passage 92 includes a horizontally directed section 93, the latter communicating with the smaller end of an outwardly flaring but progressively flattened opening 94 which is formed in the block 90. The block 91 is provided with a chamber 95 for the reception of an oil ring 96.

This ring is of the same general type as that described in the previous forms of my invention, with the exception that the axial opening 97 therein is of a shape conforming to the irregular shape of the plastic article undergoing formation. In this instance, the opening 97 is substantially I-shaped in transverse formation, although it will be understood that this configuration is merely illustrative and is subject to wide variation. As shown in Fig. 9, the walls of the opening 97 may also possess a varying thickness to concentrate oil on a given part of the inner surface area of said walls. The wall thicknesses of the oil ring progressively increase in the direction of travel of the plastic materials to provide for the controlled inflow of oil into the ring. By reason of its cross-sectional configuration, the ring produces the oil chamber 95 which is supplied with oil under pressure through the pipe connection 98. Strips of irregular transverse configuration are thus produced by my present apparatus which are characterized by their uniform density, cross-sectional thickness and smooth external wall surfaces. In all forms of my invention, continuous extrusion is made possible over prolonged periods of operation without encountering the difficulties which are attributable to improper lubrication.

It will be understood that other constructions may be employed without departing from the scope of the present invention since, in this application, I have merely illustrated and described several specific forms of the apparatus for the extrusion of different types of plastic products. Also, while my apparatus is adapted for the extrusion of various types of synthetic resins or organic plastics, it is entirely possible to apply the same to the extrusion of other products whether organic or inorganic and I contemplate herein all such uses of my invention.

I claim:

1. Apparatus for extruding organic plastic materials, comprising a die head having a forming orifice through which plastics in a heated formative state are advanced under positive flow conditions, said head being formed with a chamber, a lubricating ring positioned in said chamber, said ring having an inner wall of uniform diameter throughout its length, said wall defining an opening forming a part of said orifice, the outer wall surfaces of said ring possessing a tapered formation which in association with the inner wall surfaces define a ring body progressively increasing in cross-sectional thickness from one side thereof to the other, said body being formed from a material having a porosity admitting of the passage of a lubricant therethrough under pressure, and means for introducing a lubricant under pressure into said head chamber for passage through said ring in which the greatest amount of the lubricant passes through that portion of the ring having reduced body thickness and through which portion the plastic material initially passes upon entering the ring and a relatively reduced amount of the lubricant through that portion of the ring possessing maximum body thickness and from which thicker portion, the plastic material travels immediately prior to being discharged from the ring.

2. In apparatus for extruding organic plastic materials in formed shapes, a die head having a chamber, a lubricating ring positioned in said chamber, said ring being formed from a metal sufficiently porous in its composition as to provide for the direct passage therethrough of a lubricant under pressure, said ring having a body progressively increasing in cross-sectional thickness from one side of the ring to its other to vary the volume of lubricant penetrating said ring so that the greatest amount of lubricant enters an axial bore of the ring adjacent to the plastic-receiving end of said bore and the least amount of lubricant at the plastic-discharging end of the ring bore.

3. In apparatus for extruding organic plastic materials in formed shapes, comprising a die head having a forming orifice through which plastics in a heated state are advanced under positive pressure, said orifice including a chamber, inner and outer annular lubricating rings disposed in spaced concentric order within said chamber, each of said rings being formed from a metal having a porosity admitting of the passage of a lubricant under pressure therethrough, each of said rings having a tapered body, whereby the wall thickness of the body progressively varies from its plastic-receiving to its plastic-discharging end.

4. Apparatus for extruding organic plastic materials comprising a die head having a forming orifice through which plastics in a heated state are adapted to be advanced under pressure, a lubricating ring positioned in said chamber, said ring having an inner bore of uniform diameter throughout its length and which bore forms a part of the total length of said orifice, the outer surface of said ring having a frusto-conical configuration to cause the ring to possess a progressively increasing cross-sectional thickness from one end thereof to the other, the thickness of the ring being at its minimum where the plastic materials enter the ring and at its maximum where said materials leave the ring, and means for introducing a lubricant under pressure into the space formed between the outer surfaces of said ring and the bounding wall surfaces of said chamber.

5. Apparatus for extruding organic plastic materials comprising a die head having a forming orifice through which plastics in a heated state are adapted to be advanced under pressure, a lubricating ring positioned in said chamber, said ring having an inner bore of uniform diameter throughout its length and which bore forms a part of the total length of said orifice, the outer surfaces of said ring possessing a substantially spool-shaped configuration, causing said ring to possess progressively increasing body thicknesses from one end thereof to the other, said thickness being at its minimum value at the material entering end of the ring and of maximum value at the material-discharging end of said ring, and means for introducing a lubricant under pressure into the space formed between the outer surfaces of said ring and the bounding wall surfaces of said chamber.

6. Extruding apparatus comprising a sectional head having a body section formed with an internal passage to receive and advance plastic materials discharged under pressure from an associated extruder; inner, intermediate and outer plate members forming a part of said head; means separably uniting said plate members in fixed relative order on said body section, with the inner plate member in direct contact with a face of said body section arranged in registry with the outlet end of the passage thereof, said inner plate being formed axially with an outwardly flaring opening, the smaller end of which opening registers with the outlet end of the body section passage to receive plastic material discharged from the latter, said intermediate plate member being formed with an axial opening arranged in longitudinal registry with the opening of the inner plate member, the opening of said inner plate member being formed to provide an enlarged oil ring-receiving chamber, said outer plate member being formed with an axial opening disposed in longitudinal registry with the openings of said inner and intermediate plate members, an oil ring of lubricant-pervious composition positioned in the chamber of said intermediate plate member; and means for supplying a lubricant under pressure to said chamber for penetration through said ring and into said opening in the intermediate plate member to facilitate the flow of plastic material through the head.

7. Extruding apparatus as defined in claim 6, and wherein said oil ring is provided with an internal bore registering with the axial openings formed in said plate members for the transmission of plastic materials, the outer wall surfaces of said ring being tapered in a manner imparting to the ring a progressively increasing wall thickness from the end thereof into which the plastic material enters to the end thereof from which said plastic material is discharged.

DONALD J. WEBER.

REFERENCES CITED

The following references are of record in the file of this patent:

UNITED STATES PATENTS

| Number | Name | Date |
| --- | --- | --- |
| 445,711 | Chase | Feb. 3, 1891 |
| 1,858,620 | Frandsen | May 17, 1932 |
| 2,177,633 | Blackard | Oct. 31, 1939 |
| 2,307,034 | Gaenzle | Jan. 5, 1943 |
| 2,317,689 | Larchar | Apr. 27, 1943 |